US011875751B2

(12) United States Patent
Cho et al.

(10) Patent No.: US 11,875,751 B2
(45) Date of Patent: Jan. 16, 2024

(54) DISPLAY DEVICE WITH INTRA-INTERFACE FOR SIMPLE SIGNAL TRANSMITTAL PATH

(71) Applicant: LG DISPLAY CO., LTD., Seoul (KR)

(72) Inventors: Soon-Dong Cho, Gumi-si (KR); Jung-Jae Kim, Goyang-si (KR); Min-Gyu Park, Seoul (KR); Jae-Won Han, Goyang-si (KR); Dong-Won Park, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/943,779

(22) Filed: Sep. 13, 2022

(65) Prior Publication Data

US 2023/0005435 A1 Jan. 5, 2023

Related U.S. Application Data

(62) Division of application No. 17/124,116, filed on Dec. 16, 2020, now Pat. No. 11,475,843.

(30) Foreign Application Priority Data

Dec. 17, 2019 (KR) ........................ 10-2019-0168865

(51) Int. Cl.
*G09G 3/3266* (2016.01)
*G09G 3/3275* (2016.01)

(52) U.S. Cl.
CPC ......... *G09G 3/3266* (2013.01); *G09G 3/3275* (2013.01); *G09G 2310/027* (2013.01); *G09G 2310/0289* (2013.01); *G09G 2310/08* (2013.01); *G09G 2370/00* (2013.01)

(58) Field of Classification Search
None
See application file for complete search history.

(56) References Cited

U.S. PATENT DOCUMENTS

2006/0202938 A1* 9/2006 Chen .................... G09G 3/3685 345/100
2009/0122034 A1* 5/2009 Shin ..................... G09G 3/3677 345/204

FOREIGN PATENT DOCUMENTS

KR 10-2013-0009496 A 1/2013

* cited by examiner

*Primary Examiner* — Christopher J Kohlman
(74) *Attorney, Agent, or Firm* — POLSINELLI PC

(57) ABSTRACT

A display device includes a display panel including pixels, and data lines and gate lines connected to the pixels, a timing controller configured to output source driving bit information and gate driving bit information through an intra-interface signal, a source driver configured to generate data driving signal based on the source driving bit information and to supply the data driving signal to the data lines, and a gate driver configured to generate a gate driving signal based on the gate driving bit information and to supply the gate driving signal to the gate lines, wherein the intra-interface signal is configured with predetermined data transmission units and includes both the source driving bit information and the gate driving bit information every 1 data transmission unit.

5 Claims, 13 Drawing Sheets

DISPLAY DEVICE WITH INTRA-INTERFACE FOR SIMPLE SIGNAL TRANSMITTAL PATH

CROSS-REFERENCE TO RELATED APPLICATIONS

This application is a divisional of U.S. patent application Ser. No. 17/124,116, filed on Dec. 16, 2020, which claims the benefit of Korean Patent Application No. 10-2019-0168865, filed on Dec. 17, 2019, which are hereby incorporated by reference in their entirety for all purposes as if fully set forth herein.

BACKGROUND

Field of the Disclosure

The present disclosure relates to a display device including an intra-interface.

Description of the Background

With advances in display technologies, various active matrix type display devices have been provided, and thereamong, liquid crystal display devices and electroluminescent display devices have been well known. In particular, the electroluminescent display device includes an organic or inorganic light emitting layer that autonomously emits light, and advantageously, has a high response speed, high luminous efficiency, high brightness, and a high viewing angle.

A display device includes a panel driver for driving a display panel. The panel driver includes a source driver for driving data lines of the display panel, and a gate driver for driving gate lines of the display panel. The panel driver communicates with a timing controller and receives various pieces of information required for an operation. The source driver is connected to the timing controller through an intra-interface and receives information for driving a source from the timing controller. The gate driver receives information driving a gate from the timing controller through a separate gate transmission wiring separated from the intra-interface.

The source driver and the gate driver are connected to the timing controller through different transmission paths, and thus, the number of output pins of the timing controller is high, and the areas of a connection cable, a connector, and a source printed circuit board (SPCB) used as a transmission path are high. In addition, in accordance with recent trends, the number of information for driving a gate has increased due to various functions of a display device, and thus, a circuit for signal transmission has been complicated and an installation area thereof has increased.

SUMMARY

To overcome the aforementioned problem of the related art, the present disclosure may provide a display device for simplifying a signal transmission path between a timing controller and a panel driver and reducing a circuit installation area for signal transmission.

To achieve these objects and other advantages and in accordance with the purpose of the disclosure, as embodied and broadly described herein, a display device includes a display panel including pixels, and data lines and gate lines connected to the pixels, a timing controller configured to output source driving bit information and gate driving bit information through an intra-interface signal, a source driver configured to generate data driving signal based on the source driving bit information and to supply the data driving signal to the data lines, and a gate driver configured to generate a gate driving signal based on the gate driving bit information and to supply the gate driving signal to the gate lines, wherein the intra-interface signal is configured with predetermined data transmission units and includes both the source driving bit information and the gate driving bit information every 1 data transmission unit

BRIEF DESCRIPTION OF THE DRAWINGS

The accompanying drawings, which are included to provide a further understanding of the disclosure and are incorporated in and constitute a part of the present disclosure, illustrate aspect(s) of the disclosure and together with the description serve to explain the principle of the disclosure.

In the drawings

DETAILED DESCRIPTION

Figure 1:
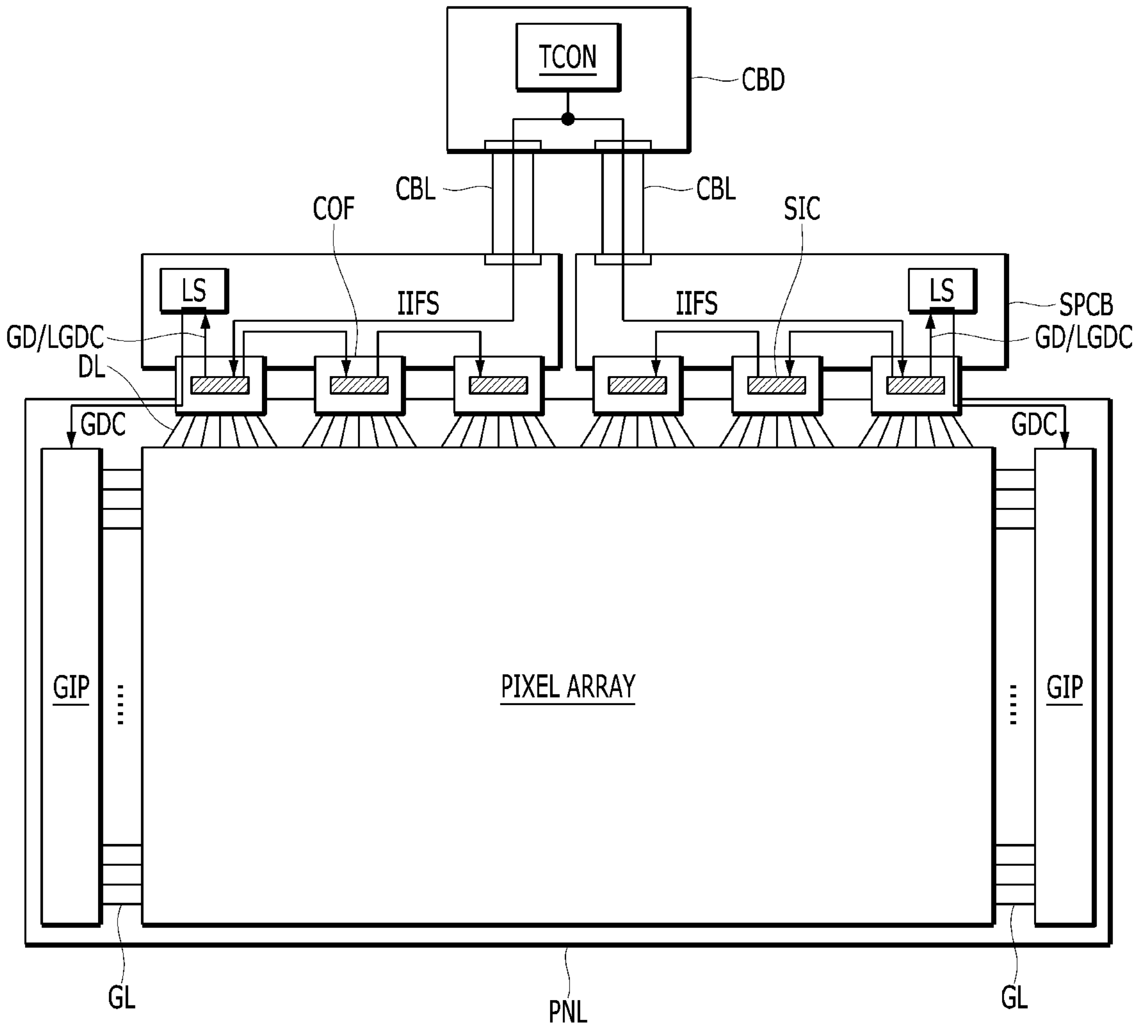
FIG. 1 is a block diagram of a display device according to a first aspect of the present disclosure.

Hereinafter, the present disclosure will be described more fully with reference to the accompanying drawings, in which exemplary aspects of the disclosure are shown. The disclosure may, however, be embodied in many different forms and should not be construed as being limited to the aspects set forth herein; rather, these aspects are provided so that this disclosure will be thorough and complete, and will fully convey the concept of the disclosure to those skilled in the art.

The shapes, sizes, ratios, angles, numbers and the like disclosed in the drawings for description of various aspects of the present disclosure to describe aspects of the present disclosure are merely exemplary and the present disclosure is not limited thereto. Like reference numerals refer to like elements throughout. Throughout this specification, the same elements are denoted by the same reference numerals. As used herein, the terms "comprise", "having," "including" and the like suggest that other parts can be added unless the term "only" is used. As used herein, the singular forms "a", "an", and "the" are intended to include the plural forms as well, unless context clearly indicates otherwise.

Elements in various aspects of the present disclosure are to be interpreted as including margins of error even without explicit statements.

With regard to the following description of the present disclosure, in describing positional relationships, phrases such as "an element A on an element B," "an element A above an element B," "an element A below an element B" and "an element A next to an element B," another element C may be disposed between the elements A and B unless the term "immediately" or "directly" is explicitly used.

With regard to the following description of the present disclosure, in describing elements, terms such as "first" and "second" are used, but the elements are not limited by these terms. These terms are simply used to distinguish one element from another. Accordingly, as used herein, a first element may be a second element within the technical idea of the present disclosure.

In the following description of the present disclosure, a detailed description of known functions and configurations incorporated herein will be omitted when it may make the subject matter of the present disclosure unclear.

Hereinafter, an aspect of the present disclosure will be described in detail with reference to the accompanying drawings.

A display device according to an aspect of the present disclosure may be embodied as an electroluminescent display device, but the present disclosure is not limited thereto. Needless to say, the display device according to an aspect of the present disclosure may also be applied to various display devices for writing image data in synchronization with a scan signal, for example, a liquid crystal display device. In the following aspects, for convenience, a display device embodied as an electroluminescent display device will be exemplified.

FIGS. 1 to 8 are reference drawings for explaining a display device according to a first aspect of the present disclosure.

Referring to FIGS. 1 to 4, the display device according to a first aspect of the present disclosure may include a display panel PNL, a timing controller TCON, a panel driver, and the like. Through a signal transmission path according to the first aspect, the timing controller TCON may supply various pieces of information required for an operation to the panel driver. The panel driver may include a source driver and a gate driver.

Referring to FIGS. 1 to 4, the display panel PNL may include a pixel array for embodying an image. A pixel array PARY may include data lines DL, gate lines GL, and pixels connected thereto DL and GL.

Figure 2:
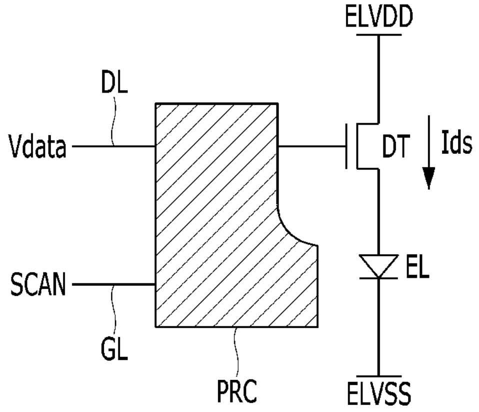
FIG. 2 is a schematic circuit diagram of one pixel included in the display device of FIG. 1.

As shown in FIG. 2, each of the pixels may include a light emitting device EL, a driving device DT, and a programming circuit unit PRC. The programming circuit unit PRC may include at least one switching device connected to a data line DL and a gate line GL, a capacitor connected to the switching device, or the like, and may apply a data voltage Vdata to a voltage between a gate and a source of the driving device DT. The driving device DT may generate driving current Ids appropriate for the data voltage Vdata and may supply the driving current Ids to an organic light emitting diode (OLED). The OLED may emit light with brightness that is proportional to the driving current Ids. The OLED may include an organic light emitting layer, but the present disclosure is not limited thereto. The OLED may also include an inorganic light emitting layer.

These pixels may apply a high-potential pixel voltage source ELVDD and a low-potential pixel voltage source ELVSS required for driving to the pixel. The driving device DT and the switching device of the pixel may be embodied as a thin film transistor. The thin film transistor may be embodied in a p type or an n type, but the present disclosure is not limited thereto. The thin film transistor may also be embodied in a hybrid type including both p and n types. In addition, a semiconductor layer of the thin film transistor may include amorphous silicon, poly silicon, or oxide, but the present disclosure is not limited thereto.

Referring to FIGS. 1 to 4, the timing controller TCON may be installed on a control board CBD. The timing controller TCON may receive a timing signal such as a vertical synchronization signal, a horizontal synchronization signal, a data enable signal, or a main clock from a host system (not shown), and may generate a source control signal and a gate control signal GDC for synchronizing operation timing of the source driver and the gate driver. The timing controller TCON may receive pixel data of an input image of the host system and may then process pixel data according to the resolution and transmission interface standard of the display panel PNL.

Figure 3:
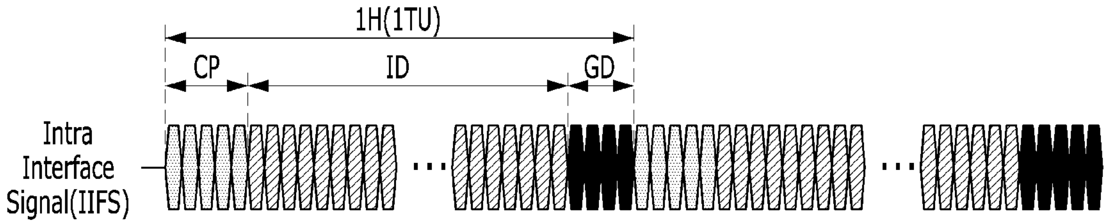
FIG. 3 is a diagram showing an intra-interface signal transmitted and received between a timing controller and a panel driver in the display device of FIG. 1.

Referring to FIGS. 1 to 4, the timing controller TCON may be connected to the source driver through an intra-interface method. The intra-interface method may be an EPI interface method for simplifying a signal transmission path between the timing controller TCON and the source driver, but the present disclosure is not limited thereto. The timing controller TCON may generate an intra-interface signal IIFS to include both source driving bit information and gate driving bit information, thereby simplifying a signal transmission path between the timing controller TCON and the panel driver. As shown in FIG. 3, the intra-interface signal IIFS may be configured with predetermined data transmission units TUs and may include both source driving bit information and gate driving bit information every 1 data transmission unit 1TU. The gate driving bit information may be transmitted through the same intra-interface wiring as the source driving bit information rather than being transmitted through separate gate transmission wirings, and thus, a circuit for signal transmission may be simplified and an installation area thereof may be reduced.

Referring to FIGS. 1 to 4, the source driving bit information may be information required to generate data driving signal (i.e., the data voltage Vdata) in the source driver, and may include pixel data bit information ID of 1 line quantity 1H and control bit information CP required to process the pixel data bit information ID of 1 line quantity in the source driver as shown in FIG. 3. Here, the pixel data bit information ID may be a sampling result value of pixel data sampled according to an intra-interface method. The control bit information CP may be logic timing information of the source control signal and may include a plurality of sampling data.

Figure 4:
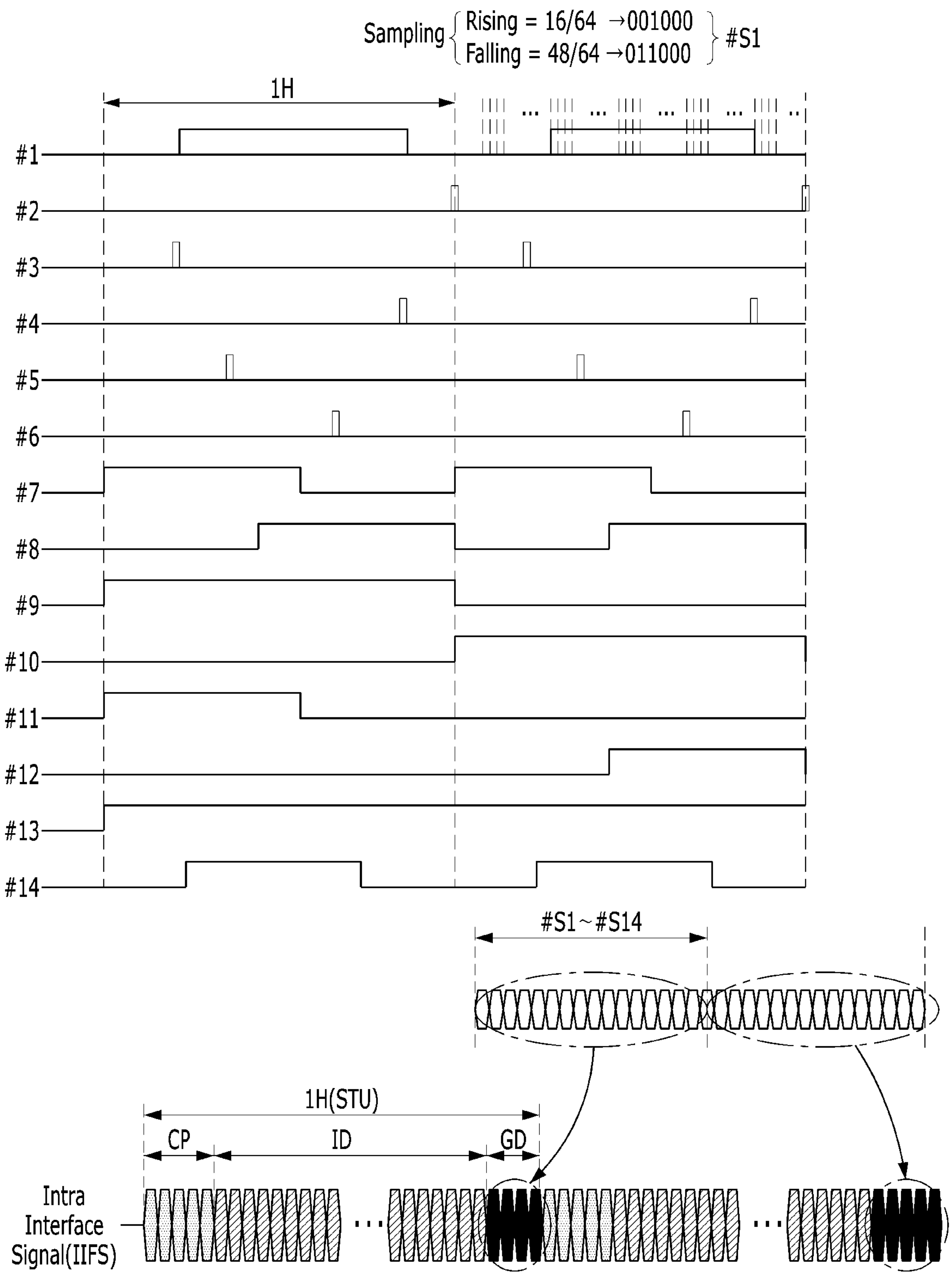
FIG. 4 is a diagram showing the case in which logic timing information of a gate control signal included in an intra-interface signal of FIG. 3 is embodied as a plurality of sampling data.

Referring to FIGS. 1 to 4, the gate driving bit information may be information required to generate a gate driving signal in the gate driver, and may include logic timing information GD of a gate control signal for generating a gate driving signal of 1 line quantity 1H as shown in FIG. 3. The logic timing information GD of the gate control signal may include a plurality of sampling data #S1 to #S14 for respective gate control logic signals #1 to #14 as shown in FIG. 4. Each of the sampling data #S1 to #S14 may include first sampling data that rises to a logic high level from a logic low level, and second sampling data that falls to the logic low level from the logic high level. For example, as shown in FIG. 4, first sampling data of sampling data #S1 may be '001000', and second sampling data of sampling data #S1 may be '011000'.

Referring to FIGS. 1 to 4, the source driver may receive the intra-interface signal IIFS from the timing controller TCON. The source driver may generate data driving signal based on the source driving bit information included in the intra-interface signal IIFS and may supply the data driving signal to the data lines DL. The source driver may include a plurality of source integrated circuits SICs installed on a conductive film. The conductive film may be a chip on film (COF), but the present disclosure is not limited thereto. The conductive film may be embodied as a tape carrier package (TCP) instead of a chip on film (COF). The source printed circuit board (SPCB) may be electrically connected to the display panel PNL through the conductive film COF and may also be electrically connected to the control board CBD through a cable CBL. The source printed circuit board (SPCB) may be configured in a singular or plural number. The cable CBL may be connected to the source printed circuit board (SPCB) and the control board CBD through a connector. The number of the cable CBL may be the same as the number of the source printed circuit boards (SPCBs), but the present disclosure is not limited thereto.

Referring to FIGS. 1 to 4, the gate driver may generate a gate driving signal based on the gate driving bit information included in the intra-interface signal IIFS and may generate the gate driving signal to the gate lines GL. The gate driver may include a level shifter LS installed on the source printed circuit board (SPCB) and a GIP circuit GIP installed on the display panel PNL.

Referring to FIGS. 1 to 4, the level shifter LS may be connected to a source integrated circuit (SIC) using various interface methods. When the level shifter LS communicates with the source integrated circuit SIC using a low voltage differential signaling (LVDS) interface method, a subject that generates a gate control logic signal LGDC from the logic timing information GD of the gate control signal may be the level shifter LS. In this case, the source integrated circuit SIC may separate the gate driving bit information from the intra-interface signal IIFS, and may convert the logic timing information GD of the separated gate control signal into the LVDS interface form and may transmit the LVDS interface form to the level shifter LS. When the level shifter LS communicates with the source integrated circuit SIC using a simple interface method, the source integrated circuit SIC may separate the gate driving bit information from the intra-interface signal IIFS, and may generate the gate control logic signal LGDC from the logic timing information GD of the separated gate control signal and may then transmit the gate control logic signal LGDC to the level shifter LS. Differently from the LVDS interface method, the simple interface method may not require an additional processing procedure for transmission form.

Referring to FIGS. 1 to 4, the level shifter LS may boost a voltage swing width of the gate control logic signal LGDC to generate the gate control signal GDC and may then supply the gate control signal GDC to the GIP circuit GIP through a signal transmission path that passes over the source printed circuit board (SPCB), the conductive film COF, and the display panel PNL.

Referring to FIGS. 1 to 4, the GIP circuit GIP may generate the gate driving signal according to the gate control signal GDC and may supply the gate driving signal to the gate lines GL. The gate control signal GDC may include a gate start signal, a plurality of gate shift clock, or the like, but the present disclosure is not limited thereto. The GIP circuit GIP may include a plurality of gate stages connected to the gate lines GL, and each stage may output a single gate driving signal or a plurality of gate driving signals in response to the gate control signal GDC.

Referring to FIGS. 1 to 4, the GIP circuit GIP may be formed on a non-display region outside a pixel array on the display panel PNL. The GIP circuit GIP may be embodied using a single feeding method or a dual feeding method. In the single feeding method, the GIP circuit GIP may be formed only at one side of the display panel PNL. In contrast, in the dual feeding method, the GIP circuit GIP may be formed at opposite sides of the display panel PNL, and opposite gate stages connected to the same gate line may be simultaneously driven. In the dual feeding method, signal delay due to RC delay may be easily reduced compared with the single feeding method.

Figure 5:
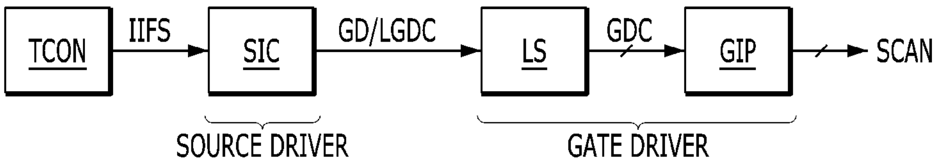
FIG. 5 is a diagram showing a signal transmission path embodied on the display device of FIG. 1 according to the first aspect of the present disclosure.

FIG. 5 is a diagram showing a signal transmission path embodied on the display device of FIG. 1 according to the first aspect of the present disclosure.

Referring to FIG. 5, the signal transmission path according to the first aspect of the present disclosure may be the timing controller TCON, the source integrated circuit SIC, the level shifter LS, and the GIP circuit GIP.

Referring to FIG. 5, the timing controller TCON and the source integrated circuit SIC may be connected to each other through the intra-interface EPI. The timing controller TCON may generate the intra-interface signal IIFS including both the source driving bit information and the gate driving bit information every 1 data transmission unit 1TU and may transmit the intra-interface signal IIFS to the source integrated circuit SIC.

Referring to FIG. 5, the source integrated circuit SIC may be connected to the level shifter LS through an LVDS interface or may be connected to the level shifter LS through a simple interface.

Referring to FIG. 5, the level shifter LS may be connected to the GIP circuit GIP through a signal transmission path that passes over the aforementioned source printed circuit board (SPCB), conductive film COF, and display panel PNL.

Figure 6:
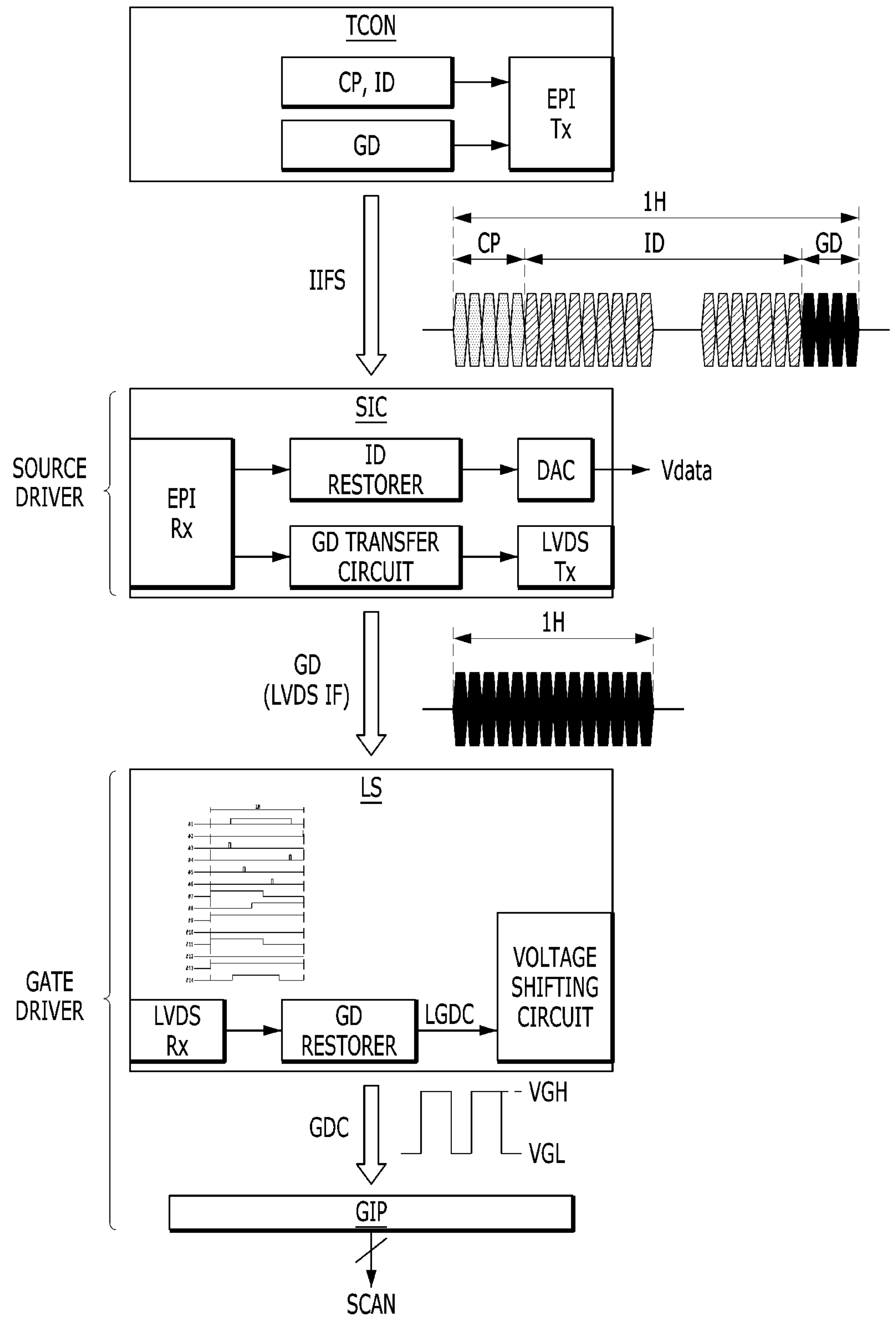
FIG. 6 is a block diagram showing a component of a panel driver for embodying FIG. 5.

FIG. 6 corresponds to the case in which the source integrated circuit (SIC) as one component of the panel driver for embodying FIG. 5 is connected to the level shifter LS through an LVDS interface.

Referring to FIG. 6, the timing controller TCON may include a sampling processor (not shown) for generating the intra-interface signal IIFS, and an EPI transmitter EPI Tx for outputting the intra-interface signal IIFS.

Referring to FIG. 6, the source integrated circuit SIC may include an EPI receiver EPI Rx for receiving the intra-interface signal IIFS, an ID restorer, a digital-analog converter DAC, a GD transfer circuit, and an LVDS transmitter LVDS Tx. The source integrated circuit SIC may include a source driver.

Referring to FIG. 6, the ID restorer may separate the source driving bit information from the intra-interface signal IIFS, may process the pixel data bit information ID every 1 line quantity 1H based on the control bit information CP, and may restore pixel data to be written on pixels of 1 line quantity, which are adjacent to each other in one direction. The digital-analog converter DAC may convert the restored pixel data into the data voltage Vdata, and may supply the data voltage Vdata as the data driving signal to data lines. The GD transfer circuit may separate the gate driving bit information from the intra-interface signal IIFS. Then, the LVDS transmitter LVDS Tx may process the logic timing information GD of the gate control signal according to the LVDS interface form and may then output the logic timing information GD to the level shifter LS through the LVDS interface. The LVDS transmitter LVDS Tx may be integrated into the GD transfer circuit. In this case, a function of the LVDS transmitter LVDS Tx may be performed by the GD transfer circuit.

Referring to FIG. 6, the level shifter LS and the GIP circuit GIP may configure the gate driver.

Figure 8:
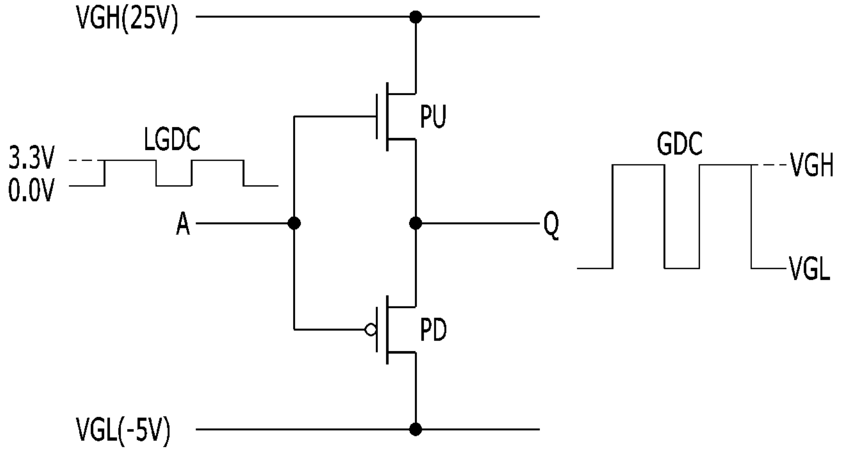
FIG. 8 is a circuit diagram showing one example of a voltage shifting circuit included in a level shifter of FIGS. 6 and 7.

Referring to FIG. 6, the level shifter LS may include a LVDS receiver LVDS Rx, a GD restorer, and a voltage shifting circuit. The LVDS receiver LVDS Rx may receive the logic timing information GD of the gate control signal in the LVDS interface form. The GD restorer may process the logic timing information GD of the gate control signal received in the LVDS interface form every 1 line quantity and may generate the gate control logic signal LGDC. The LVDS receiver LVDS Rx may be integrated into the GD restorer. In this case, a function of the LVDS receiver LVDS Rx may be performed by the GD restorer. As shown in FIG. 8, the voltage shifting circuit may boost a voltage swing width of the gate control logic signal LGDC, which swings between 0 V to 3.3 V, and may generate the gate control signal GDC that swings between a gate-on voltage VGH and a gate-off voltage VGL. The gate-on voltage VGH and the gate-off voltage VGL may be voltages required for an operation of a switching device included in pixels of the display panel. The gate-on voltage VGH may be a voltage (e.g., 25 V of FIG. 8) for turning on the switching device, and the gate-off voltage VGL may be a voltage (e.g., −5 V of FIG. 8) for turning off the switching device.

The voltage shifting circuit may include a pull-up switch PU and a pull-down switch PD that are connected in series to an output node Q and are turned on/off in opposite ways to each other as shown in FIG. 8. The pull-up switch PU may be embodied in an n type and the pull-down switch PD may be embodied in a p type. In addition, the pull-up switch PU may be embodied in a p type and the pull-down switch PD may be embodied in an n type. A gate electrode of the pull-up switch PU may be connected to an input node A, a first electrode of the pull-up switch PU may be connected to an input end of the gate-on voltage VGH, and a second electrode of the pull-up switch PU may be connected to the output node Q. in addition, a gate electrode of the pull-down switch PD may be connected to the input node A, a first electrode of the pull-down switch PD may be connected to the output node Q, and a second electrode of the pull-down switch PD may be connected to an input end of the gate-off voltage VGL.

Referring to FIG. 8, the gate control logic signal LGDC that swings between a logic low level 0 V and a logic high level 3.3 V may be input to the input node A. When the gate control logic signal LGDC is input at the logic high level 3.3 V, the pull-up switch PU may be turned on and the pull-down switch PD may be turned off, and thus, the gate-on voltage VGH of 25 V may be output as the gate control signal GDC to the output node Q. In contrast, when the gate control logic signal LGDC is input to the logic low level 0 V, the pull-up switch PU may be turned off and the pull-down switch PD may be turned on, and thus, the gate-off voltage VGL of −5 V may be output as the gate control signal GDC to the output node Q.

Referring to FIG. 6, the GIP circuit GIP may receive the gate control signal GDC from the voltage shifting circuit. The GIP circuit GIP may generate the gate driving signal SCAN according to a gate control signal GDC and may supply the gate driving signal SCAN to gate lines.

Figure 7:
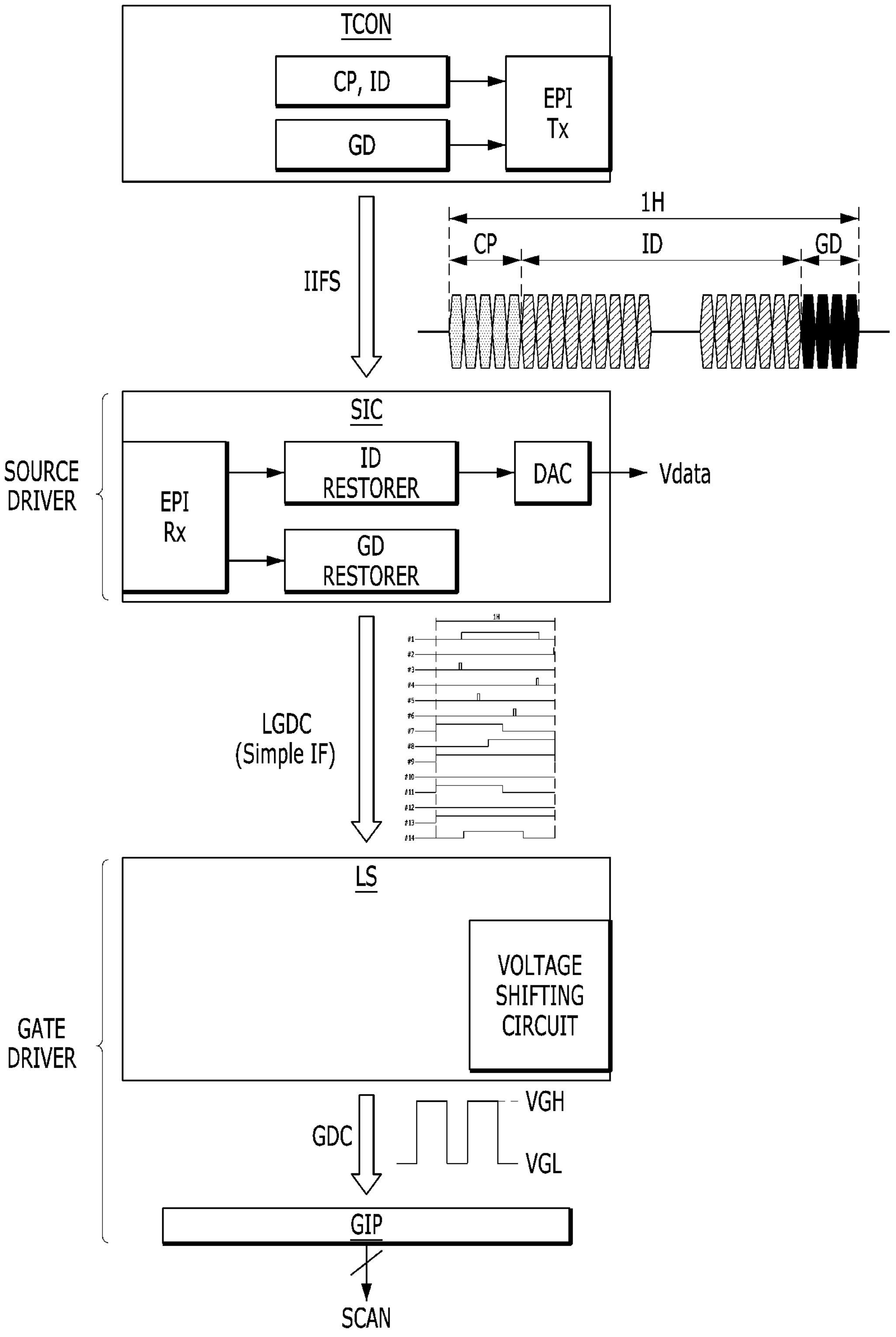
FIG. 7 is a block diagram showing another component of a panel driver for embodying FIG. 5.

FIG. 7 is a block diagram showing other components of the panel driver for embodying FIG. 5. FIG. 8 is a circuit diagram showing an example of a voltage shifting circuit included in the level shifter of FIGS. 6 and 7.

Referring to FIG. 7, the timing controller TCON may include the sampling processor (not shown) for generating the intra-interface signal IIFS, and the EPI transmitter EPI Tx for outputting the intra-interface signal IIFS.

Referring to FIG. 7, the source integrated circuit SIC may include the EPI receiver EPI Rx for receiving the intra-interface signal IIFS, the ID restorer, the digital-analog converter DAC, and the GD restorer. The source integrated circuit SIC may configure a source driver.

Referring to FIG. 7, the ID restorer may separate the source driving bit information from the intra-interface signal IIFS, may process the pixel data bit information ID every 1 line quantity 1H based on the control bit information CP, and may restore pixel data to be written in pixels of 1 line quantity, which are adjacent to each other in one direction. The digital-analog converter DAC may convert the restored pixel data into the data voltage Vdata, and may supply the data voltage Vdata as the data driving signal to data lines. The GD restorer may separate the gate driving bit information from the intra-interface signal IIFS, may process the logic timing information GD of the separated gate control signal every 1 line quantity, and may then output the gate control logic signal LGDC to the level shifter LS through a simple interface.

Referring to FIG. 7, the level shifter LS and the GIP circuit GIP may configure the gate driver.

Referring to FIG. 7, the level shifter LS may include a voltage shifting circuit. As shown in FIG. 8, the voltage shifting circuit may boost a voltage swing width of the gate control logic signal LGDC, which swings between 0 V to 3.3 V, and may generate the gate control signal GDC that swings between a gate-on voltage VGH and a gate-off voltage VGL. The configuration and the operation of the voltage shifting circuit are the same as the above description given with reference to FIG. 8.

Referring to FIG. 7, the GIP circuit GIP may receive the gate control signal GDC from the voltage shifting circuit. The GIP circuit GIP may generate the gate driving signal SCAN according to the gate control signal GDC, and may supply the gate driving signal SCAN to gate lines.

Figure 9:
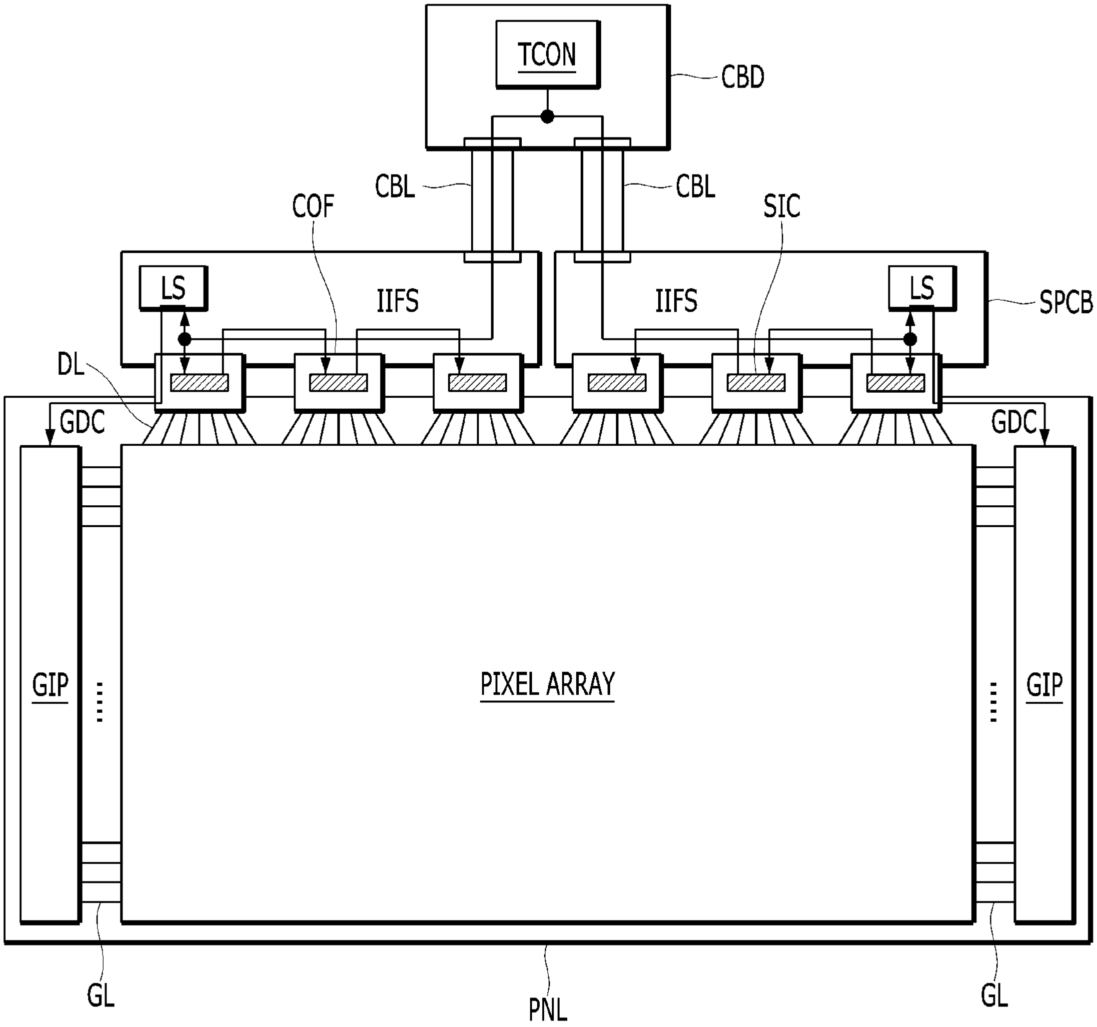
FIG. 9 is a block diagram of a display device according to a second aspect of the present disclosure.
Figure 10:
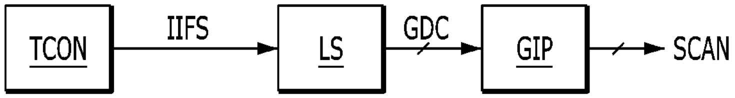
FIG. 10 is a diagram showing a signal transmission path embodied on the display device of FIG. 9 according to the second aspect of the present disclosure.
Figure 11:
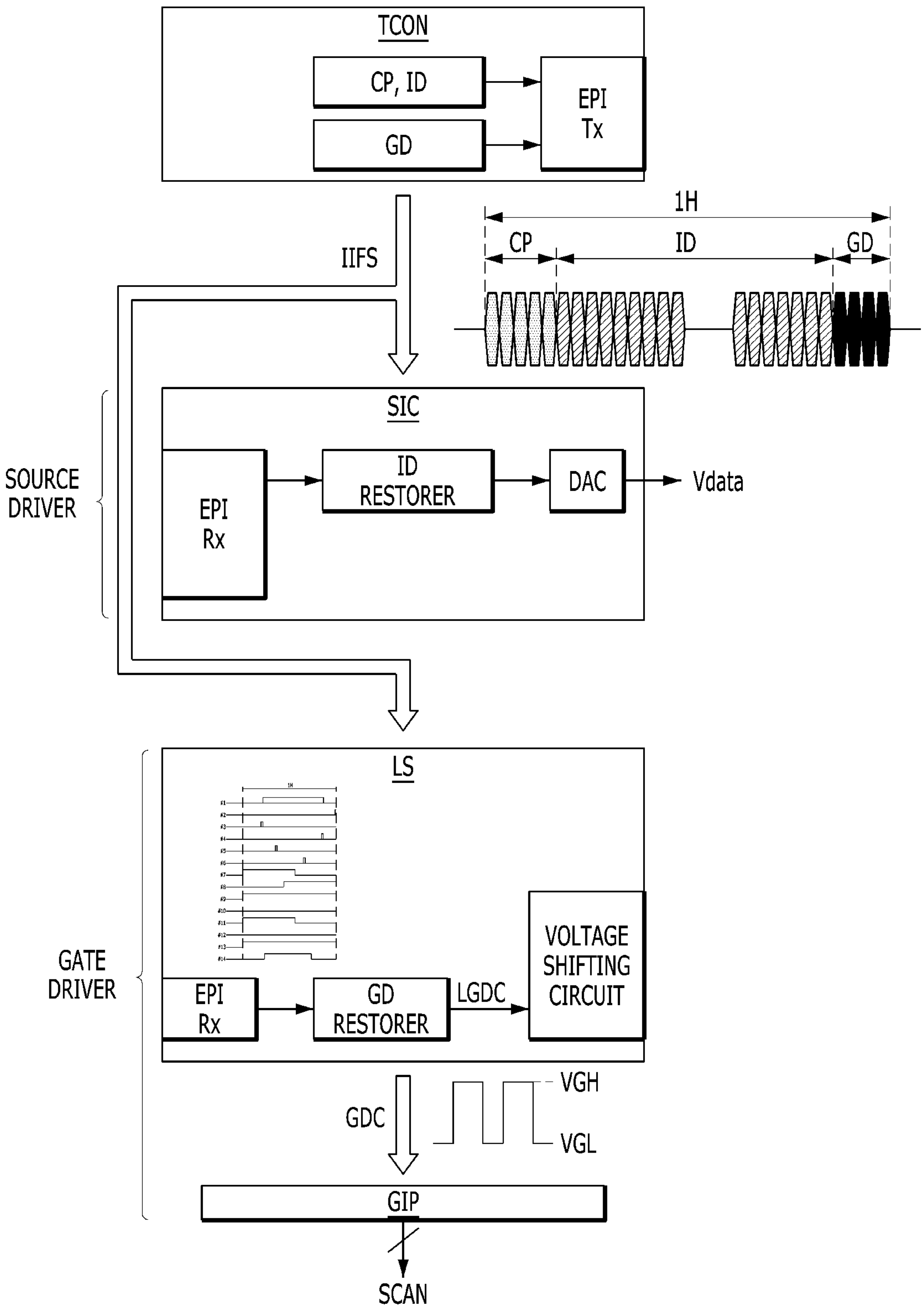
FIG. 11 is a block diagram showing a component of a panel driver for embodying FIG. 10.

FIGS. 9 to 11 are reference drawings for explaining a display device according to a second aspect of the present disclosure.

Referring to FIG. 9, the pixel shown in FIG. 2, the data transmission units shown in FIG. 3, and the sampling method shown in FIG. 4 may also be applied to the display device according to the second aspect of the present disclosure without change.

The display device of FIG. 9 may be different from the display device of FIG. 1 in that the intra-interface signal IIFS is transmitted directly to the level shifter LS. In the display device of FIG. 9, the intra-interface signal IIFS is transmitted directly to the level shifter LS instead of the source integrated circuit SIC, and thus, it is advantageously not required to change the source integrated circuit SIC.

Referring to FIG. 9, the timing controller TCON may be connected in parallel to the source integrated circuit SIC and the level shifter LS using an intra-interface method. The intra-interface method may be an EPI interface method for simplifying a signal transmission path between the timing controller TCON and the source integrated circuit SIC, and between the timing controller TCON and the level shifter LS, but the present disclosure is not limited thereto. The timing controller TCON may generate the intra-interface signal IIFS to include both the source driving bit information and the gate driving bit information, thereby simplifying a signal transmission path between the timing controller TCON and the panel driver. As shown in FIG. 3, the intra-interface signal IIFS may be configured with predetermined data transmission units TUs and may include both the source driving bit information and the gate driving bit information every 1 data transmission unit 1TU. The gate driving bit information may be transmitted through the same intra-interface wiring as the source driving bit information rather than being transmitted through separate gate transmission wirings, and thus, a circuit for signal transmission may be simplified and an installation area thereof may be reduced. The source driving bit information and the gate driving bit information are the same as the above description given with reference to FIG. 3.

Referring to FIG. 9, the source driver may receive the intra-interface signal IIFS from the timing controller TCON. The source driver may generate the data driving signal based on the source driving bit information included in the intra-interface signal IIFS and may supply the data driving signal to the data lines DL. The source driver may include a plurality of source integrated circuits SICs installed on the conductive film. The conductive film may be a chip on film (COF), but the present disclosure is not limited thereto. The conductive film may be embodied as a tape carrier package (TCP) instead of a chip on film (COF). The source printed circuit board (SPCB) may be electrically connected to the display panel PNL through the conductive film COF and may also be electrically connected to the control board CBD through the cable CBL. The source printed circuit board (SPCB) may be configured in a singular or plural number. The cable CBL may be connected to the source printed circuit board (SPCB) and the control board CBD through a connector. The number of the cable CBL may be the same as the number of the source printed circuit boards (SPCBs), but the present disclosure is not limited thereto.

Referring to FIG. 9, the gate driver may generate the gate driving signal based on the gate driving bit information included in the intra-interface signal IIFS and may supply the gate driving signal to the gate lines GL. The gate driver may include the level shifter LS installed on the source printed circuit board (SPCB) and the GIP circuit GIP installed on the display panel PNL.

Referring to FIG. 9, the level shifter LS may be connected to the timing controller TCON using an intra-interface method. The level shifter LS may directly receive the intra-interface signal IIFS from the timing controller TCON, and thus, an operation of separating the gate driving bit information from an intra-interface signal, and an operation of processing logic timing information of the gate control signal every 1 line quantity and generating a gate control logic signal may be directly performed by the level shifter LS.

Referring to FIG. 9, the level shifter LS may boost a voltage swing width of the gate control logic signal and generate the gate control signal GDC, and may then supply the gate control signal GDC to the GIP circuit GIP through a signal transmission path that passes over the source printed circuit board (SPCB), the conductive film COF, and the display panel PNL.

Referring to FIG. 9, the GIP circuit GIP may generate a gate driving signal according to the gate control signal GDC and may supply the gate driving signal to the gate lines GL. The gate control signal GDC may include a gate start signal, a plurality of gate shift clock, or the like, but the present disclosure is not limited thereto. The GIP circuit GIP may include a plurality of gate stages connected to the gate lines GL, and each stage may output a single gate driving signal or a plurality of gate driving signals in response to the gate control signal GDC.

FIG. 10 is a diagram showing a signal transmission path embodied on the display device of FIG. 9 according to the second aspect of the present disclosure.

Referring to FIG. 10, the signal transmission path according to the second aspect of the present disclosure may be the timing controller TCON, the level shifter LS, and the GIP circuit GIP.

Referring to FIG. 10, the timing controller TCON and the source integrated circuit SIC, and the timing controller TCON and the level shifter LS may be connected through an intra-interface EPI. The timing controller TCON may generate the intra-interface signal IIFS including both the source driving bit information and the gate driving bit information every 1 data transmission unit 1TU, and may transmit the intra-interface signal IIFS in parallel to the source integrated circuit SIC and the level shifter LS. The source integrated circuit SIC and the level shifter LS may be independent from each other.

Referring to FIG. 10, the level shifter LS may be connected to the GIP circuit GIP through a signal transmission path that passes over the aforementioned source printed circuit board (SPCB), conductive film COF, and display panel PNL.

FIG. 11 is a diagram showing the configuration of the panel driver for embodying FIG. 10.

Referring to FIG. 11, the timing controller TCON may include the sampling processor (not shown) for generating the intra-interface signal IIFS, and the EPI transmitter EPI Tx for outputting the intra-interface signal IIFS.

Referring to FIG. 11, the source integrated circuit SIC may include the EPI receiver EPI Rx for receiving the intra-interface signal IIFS, the ID restorer, and the digital-analog converter DAC. The source integrated circuit SIC may configure a source driver.

Referring to FIG. 11, the ID restorer may separate the source driving bit information from the intra-interface signal IIFS, may process the pixel data bit information ID every 1 line quantity 1H based on the control bit information CP, and may restore pixel data to be written in pixels of 1 line quantity, which are adjacent to each other in one direction. The digital-analog converter DAC may convert the restored pixel data into the data voltage Vdata and may supply the data voltage Vdata as data driving signal to data lines.

Referring to FIG. 11, the level shifter LS and the GIP circuit GIP may configure a gate driver.

Referring to FIG. 11, the level shifter LS may include the EPI receiver EPI Rx, the GD restorer, and the voltage shifting circuit. The EPI receiver EPI Rx may receive the intra-interface signal IIFS. The GD restorer may separate source driving bit information from the intra-interface signal IIFS, may process the logic timing information GD of the separated gate control signal every 1 line quantity, and may generate the gate control logic signal LGDC. As shown in FIG. 8, the voltage shifting circuit may boost a voltage swing width of the gate control logic signal LGDC, which swings between 0 V to 3.3 V, and may generate the gate control signal GDC that swings between the gate-on voltage VGH and the gate-off voltage VGL. The configuration and the operation of the voltage shifting circuit are the same as the above description given with reference to FIG. 8.

Referring to FIG. 11, the GIP circuit GIP may receive the gate control signal GDC from the voltage shifting circuit. The GIP circuit GIP may generate the gate driving signal SCAN according to the gate control signal GDC, and may supply the gate driving signal SCAN to gate lines.

Figure 12:
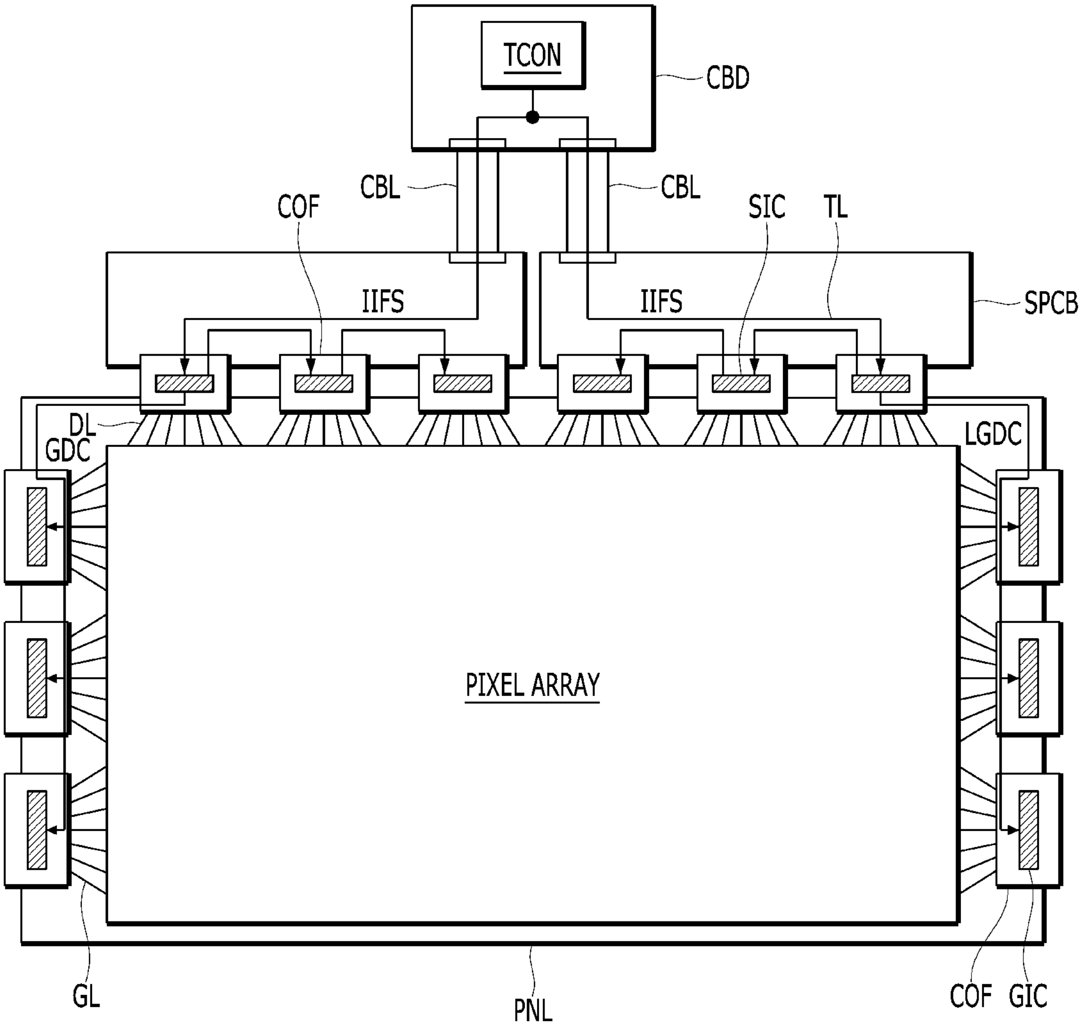
FIG. 12 is a block diagram of a display device according to a third aspect of the present disclosure.
Figure 13:
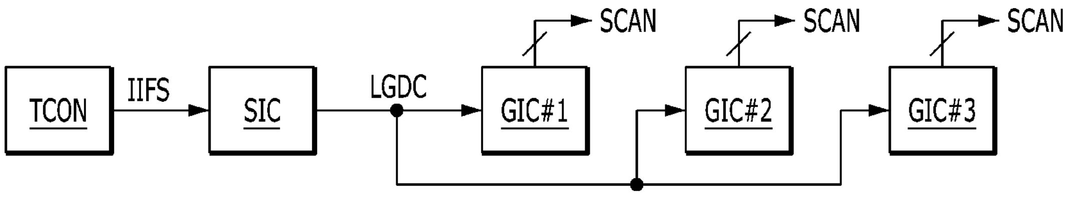
FIG. 13 is a diagram showing a signal transmission path embodied on the display device of FIG. 12 according to a third aspect of the present disclosure.
Figure 14:
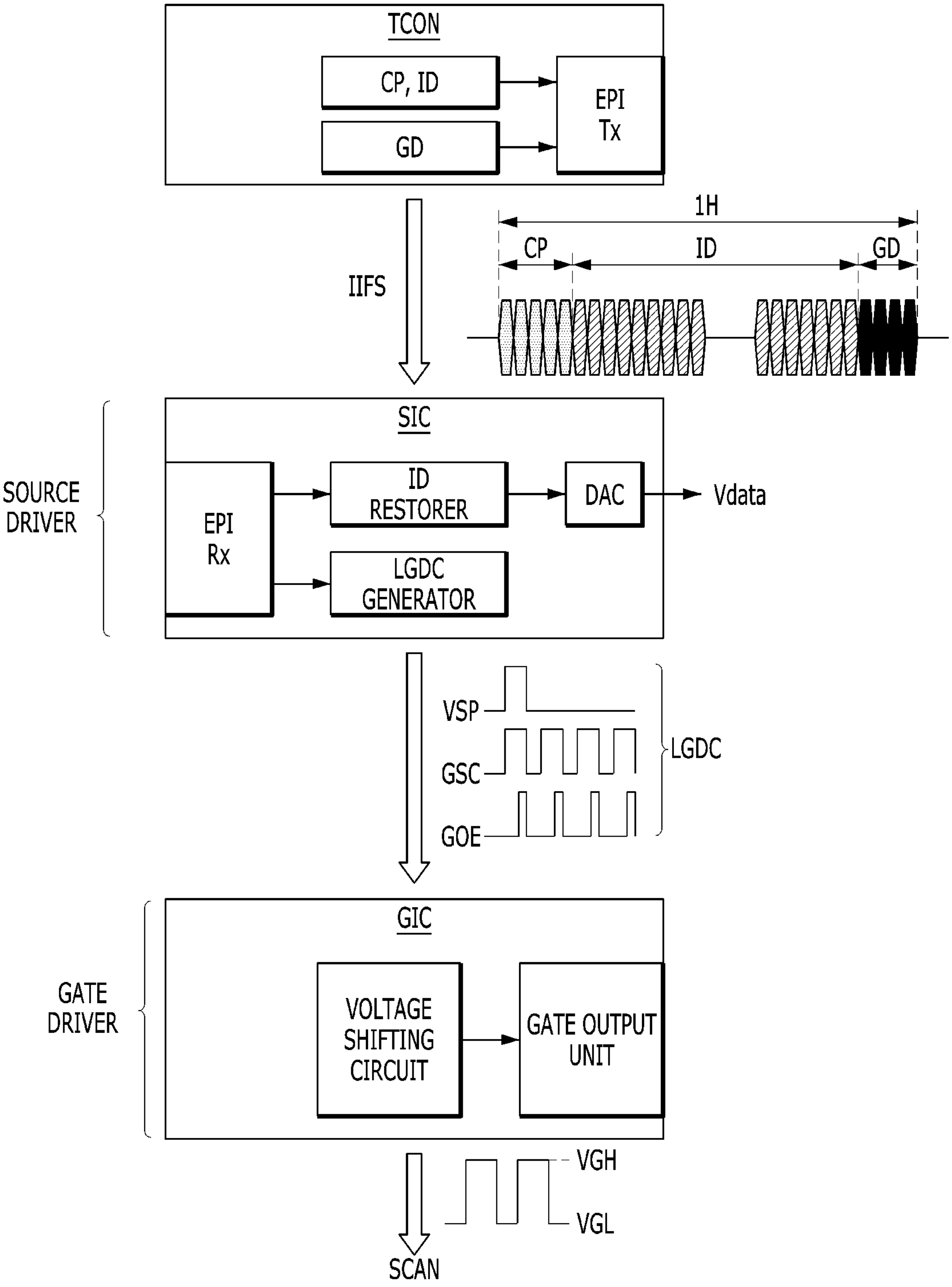
FIG. 14 is a block diagram showing a configuration of a panel driver for embodying FIG. 13.

FIGS. 12 to 14 are reference drawings for explaining a display device according to a third aspect of the present disclosure.

Referring to FIG. 12, the pixel shown in FIG. 2, the data transmission units shown in FIG. 3, and the sampling method shown in FIG. 4 may also be applied to the display device according to the third aspect of the present disclosure without change.

The display device of FIG. 12 may be different from the display device of FIG. 1 in that the gate integrated circuit GIC is included instead of the GIP circuit GIP, and the voltage shifting circuit is included in the gate integrated circuit GIC rather than being included in a level shifter.

Referring to FIG. 12, the timing controller TCON may be connected to the source integrated circuit SIC using an intra-interface method. The intra-interface method may be an EPI interface method for simplifying between the timing controller TCON and the source integrated circuit SIC, but the present disclosure is not limited thereto. The timing controller TCON may generate the intra-interface signal IIFS to include both the source driving bit information and the gate driving bit information, thereby simplifying a signal transmission path between the timing controller TCON and the panel driver. As shown in FIG. 3, the intra-interface signal IIFS may be configured with predetermined data transmission units TUs and may include both the source driving bit information and the gate driving bit information every 1 data transmission unit 1TU. The gate driving bit information may be transmitted through the same intra-interface wiring as the source driving bit information rather than being transmitted through separate gate transmission wirings, and thus, a circuit for signal transmission may be simplified and an installation area thereof may be reduced. The source driving bit information and the gate driving bit information are the same as the above description given with reference to FIG. 3.

Referring to FIG. 12, the source driver may receive the intra-interface signal IIFS from the timing controller TCON. The source driver may generate data driving signal based on the source driving bit information included in the intra-interface signal IIFS and may supply the data driving signal to the data lines DL. The source driver may separate the gate driving bit information from the intra-interface signal IIFS and may generate a gate control logic signal. The source driver may include the plurality of source integrated circuits SICs installed on the conductive film. The conductive film may be a chip on film (COF), but the present disclosure is not limited thereto. The conductive film may be embodied as a tape carrier package (TCP) instead of the chip on film (COF). The source printed circuit board (SPCB) may be electrically connected to the display panel PNL through the conductive film COF and may also be electrically connected to the control board CBD through the cable CBL. The source printed circuit board (SPCB) may be configured in a singular or plural number. The cable CBL may be connected to the source printed circuit board (SPCB) and the control board CBD through a connector. The number of the cable CBL may be the same as the number of the source printed circuit boards (SPCBs), but the present disclosure is not limited thereto.

Referring to FIG. 12, the source driver may supply the gate control signal GDC to the gate driver through a signal transmission path that passes over the conductive film COF and the display panel PNL. The gate driver may generate the gate driving signal based on a gate control logic signal received from the source driver and may supply the gate driving signal to the gate lines GL. The gate driver may include a plurality of gate integrated circuits GICs installed on the conductive film COF.

Referring to FIG. 12, the gate integrated circuits GICs may boost a voltage swing width of a gate control logic signal and may generate the gate control signal GDC, and may then generate gate driving signal based on the gate control signal GDC and may supply the gate driving signal to the gate lines GL. The gate control signal GDC may include a gate start signal, a plurality of gate shift clocks, a gate output enable signal, or the like, but the present disclosure is not limited thereto.

FIG. 13 is a diagram showing a signal transmission path embodied on the display device of FIG. 12 according to the third aspect of the present disclosure.

Referring to FIG. 13, the signal transmission path according to the third aspect of the present disclosure may be the timing controller TCON, the source integrated circuit SIC, and the gate integrated circuits GIC #1 to #3.

Referring to FIG. 13, the timing controller TCON and the source integrated circuit SIC may be connected to each other through the intra-interface EPI. The timing controller TCON may generate the intra-interface signal IIFS including both the source driving bit information and the gate driving bit information every 1 data transmission unit 1TU, and may transmit the intra-interface signal IIFS to the source integrated circuit (SIC).

Referring to FIG. 13, the source integrated circuit SIC may be connected to the gate integrated circuits GIC #1 to #3 through a signal transmission path that passes over the aforementioned conductive film COF and display panel PNL.

FIG. 14 illustrates a configuration of the panel driver for embodying FIG. 13.

Referring to FIG. 14, the timing controller TCON may include the sampling processor (not shown) for generating the intra-interface signal IIFS, and the EPI transmitter EPI Tx for outputting the intra-interface signal IIFS.

Referring to FIG. 14, the source integrated circuit SIC may include the EPI receiver EPI Rx for receiving the intra-interface signal IIFS, the ID restorer, the digital-analog converter DAC, and the LGDC restorer. The source integrated circuit SIC may configure a source driver.

Referring to FIG. 14, the ID restorer may separate the source driving bit information from the intra-interface signal IIFS, may process the pixel data bit information ID every 1 line quantity 1H based on the control bit information CP, and may restore pixel data to be written in pixels of 1 line quantity, which are adjacent to each other in one direction. The digital-analog converter DAC may convert the restored pixel data into the data voltage Vdata, and may supply the data voltage Vdata as the data driving signal to data lines. The LGDC restorer may separate the gate driving bit information from the intra-interface signal IIFS, may process the logic timing information GD of the gate control signal every 1 line quantity, and may generate the gate control logic signal LGDC.

Referring to FIG. 14, the gate integrated circuit GIC may configure a gate driver. The gate integrated circuit GIC of FIG. 14 may be any one of the gate integrated circuits GIC #1 to #3 of FIG. 13.

Referring to FIG. 14, the gate integrated circuit GIC may include a voltage shifting circuit and a gate output unit. The voltage shifting circuit may receive the gate control logic signal LGDC from the LGDC restorer, may boost a voltage boosting width of the gate control logic signal LGDC, and may generate the gate control signal GDC. As shown in FIG. 8, the voltage shifting circuit may boost a voltage swing width of the gate control logic signal LGDC, which swings between 0 V to 3.3 V, and may generate the gate control signal GDC that swings between the gate-on voltage VGH and the gate-off voltage VGL. The configuration and the operation of the voltage shifting circuit are the same as the above description given with reference to FIG. 8.

Referring to FIG. 14, a gate output unit may receive the gate control signal GDC from the voltage shifting circuit. The gate output unit may generate the gate driving signal SCAN according to the gate control signal GDC and may supply the gate driving signal SCAN to gate lines. The gate driving signal SCAN may swing between the gate-on voltage VGH and the gate-off voltage VGL.

As described above, the display device according to an aspect of the present disclosure may simplify a signal transmission path between a timing controller and a panel driver, thereby reducing an installation area of a circuit for signal transmission.

According to aspects of the present disclosure, the present disclosure may have the following effects.

The display device according to an aspect of the present disclosure may carry the gate driving bit information as well as the source driving bit information in an intra-interface signal between the timing controller and the panel driver. As such, the display device according to the present aspect may simplify a signal transmission path between the timing controller and the panel driver and may reduce an installation area of a circuit for signal transmission.

The effects according to the present disclosure are not limited to the above examples, and other various effects may be included in the specification.

While the present disclosure has been particularly shown and described with reference to exemplary aspects thereof, it will be understood by those of ordinary skill in the art that various changes in form and details may be made therein without departing from the spirit and scope of the present disclosure as defined by the following claims.

What is claimed is:

1. A display device comprising:

a display panel including pixels and data lines and gate lines connected to the pixels;

a timing controller configured to be mounted on a printed circuit board, and outputting an intra-interface signal through an intra-interface;

a source driver configured to be mounted on a conductive film electrically connecting the printed circuit board and the display panel, and generating data driving signal based on source driving bit information included in the intra-interface signal and supplying the data driving signal to the data lines; and a GIP circuit configured to be formed on the display panel, and generating a gate driving signal according to a gate control signal and supplying the gate driving signal to the gate lines;

a level shifter circuit configured to be mounted on the printed circuit board, and boosting a voltage swing width of a gate control logic signal based on gate driving bit information included in the intra-interface signal and generating the gate control signal and supplying the gate control signal to the GIP circuit;

wherein the intra-interface connects the timing controller to the source driver and the level shifter in parallel, and wherein the level shifter is connected to the GIP circuit by a signal transmission path passing through the printed circuit board, the conductive film, and the display panel but excluding the source driver.

2. The display device of claim 1, wherein the source driving bit information includes image data bit information of 1 line quantity and control bit information required to process the image data bit information of 1 line quantity in the source driver; and wherein the gate driving bit information includes logic timing information of the gate control signal for generating a gate driving signal to be applied to pixels of the 1 line quantity.

3. The display device of claim 2, wherein the gate control signal has logic timing information including a plurality of sampling data, each of the plurality of sampling data including a first sampling data that rises to a logic high level from a logic low level, and second sampling data that falls to the logic low level from the logic high level.

4. The display device of claim 3, wherein the source driver includes:

an ID restorer configured to separate the source driving bit information from the intra-interface signal, to process the image data bit information every 1 line quantity based on the control bit information, and to restore image data to be written in pixels of 1 line quantity, which are adjacent to each other in one direction; and a digital-analog converter configured to convert the restored image data into a data voltage, and to supply the data voltage as the data driving signal to the data lines.

5. The display device of claim 1, further comprising;

a GD restorer configured to separate the gate driving bit information from the intra-interface signal, to process logic timing information of the gate control signal every 1 line quantity, and to generate the gate control logic signal.

* * * * *